United States Patent [19]

Mahncke et al.

[11] Patent Number: 4,862,986
[45] Date of Patent: Sep. 5, 1989

[54] STEERING AXLE

[75] Inventors: Juergen Mahncke, Lehningen-Tiefenbronn; Heinz-Peter Kuesters, Vaihingen/Enz; Hartmut Mayer, Ditzingen, all of Fed. Rep. of Germany

[73] Assignee: Dr. Ing. h.c.F. Porsche Aktiengesellschaft, Stuttgart, Fed. Rep. of Germany

[21] Appl. No.: 220,578

[22] Filed: Jul. 18, 1988

[30] Foreign Application Priority Data

Jul. 17, 1987 [DE] Fed. Rep. of Germany ....... 3723705

[51] Int. Cl.4 ............................................. B62D 5/12
[52] U.S. Cl. .................................................. 180/155
[58] Field of Search ................ 180/254, 255; 280/111; 92/161

[56] References Cited

U.S. PATENT DOCUMENTS 4,046,218 9/1977 Blaisdell et al. ................... 180/155

FOREIGN PATENT DOCUMENTS 2409523 9/1975 Fed. Rep. of Germany .
2844146 5/1979 Fed. Rep. of Germany .

Primary Examiner—Mitchell J. Hill
Attorney, Agent, or Firm—Barnes & Thornburg

[57] ABSTRACT

A steering axle for a lift truck includes a double-acting steering cylinder whose tubular cylinder member is closed off at each end by way of a cover. The steering cylinder includes a tubular cylinder member retained inside of a cylindrical mounting of a part of the cover. This forms within the area of the mounting an additional stroke space that is delimited at the end of the tubular member by a bearing flange of the cover which is rigidly connected with a support frame by way of oppositely disposed threaded bolts whereby the support frame is held fixed at the body.

6 Claims, 2 Drawing Sheets

STEERING AXLE

BACKGROUND AND SUMMARY OF THE INVENTION

The present invention relates to a steering axle, especially for a lift truck with a double-acting steering cylinder whose tubular cylinder member is closed off by way of a cover and is retained at a frame.

It is the object of the present invention to provide a steering axle for a lift truck which can be installed in the support frame with relatively large tolerance compensation in a simple manner and produces a relatively long stroke travel by means of a relatively short tubular cylinder member.

The underlying problems are solved according to the present invention in that the steering cylinder includes tubular cylinder member retained inside of a cylindrical mounting of a part of the cover, which with its free end forms an additional stroke space within the area of the mounting that is delimited at the end of the tubular member by a bearing flange of the cover which is rigidly connected with the support frame by oppositely disposed threaded bolts.

The advantages principally achieved with the present invention reside in that the steering cylinder can be installed in an axle frame in a simple manner, whereby an additional threaded connection between the tubular cylinder member and the closure cover can be dispensed with. Owing to a longitudinal play between the tubular member and the covers, the same can be fitted accurately with respect to the axle frame, for which purpose contribute in particular the bushings that align the bolts in the cover axially accurately with respect to the bores in the frame.

The cover is clamped against the axle frame by threaded bolts and is frictionally fixed so that no rotation of the covers on the bushings as a result of transverse forces is possible any longer which otherwise would have as a consequence a rotation of the cylinder rods on the guide band.

For simplifying the installation of the cylinder at the frame, a clearance is provided between a fastening section of the cover and a bearer of the frame which can be determined by way of a bushing so that a coarse, price-favorable machining of the cover, of the tubular cylinder member and of the frame becomes possible.

The arrangement of the guide band and of the threaded bolts in a common vertical plane offers the advantage that no moments can result with the absorption of transverse forces and thus an additional load of the components is dispensed with most far-reachingly.

The tubular cylinder member of the steering axle is so arranged in a cylindrical mounting of the cover that an additional stroke space results within the area of the mounting and, as a result thereof, an optimal utilization of the entire tubular length follows as regards its enclosed space.

BRIEF DESCRIPTION OF THE DRAWINGS

These and other objects, features and advantages of the present invention will becomes more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
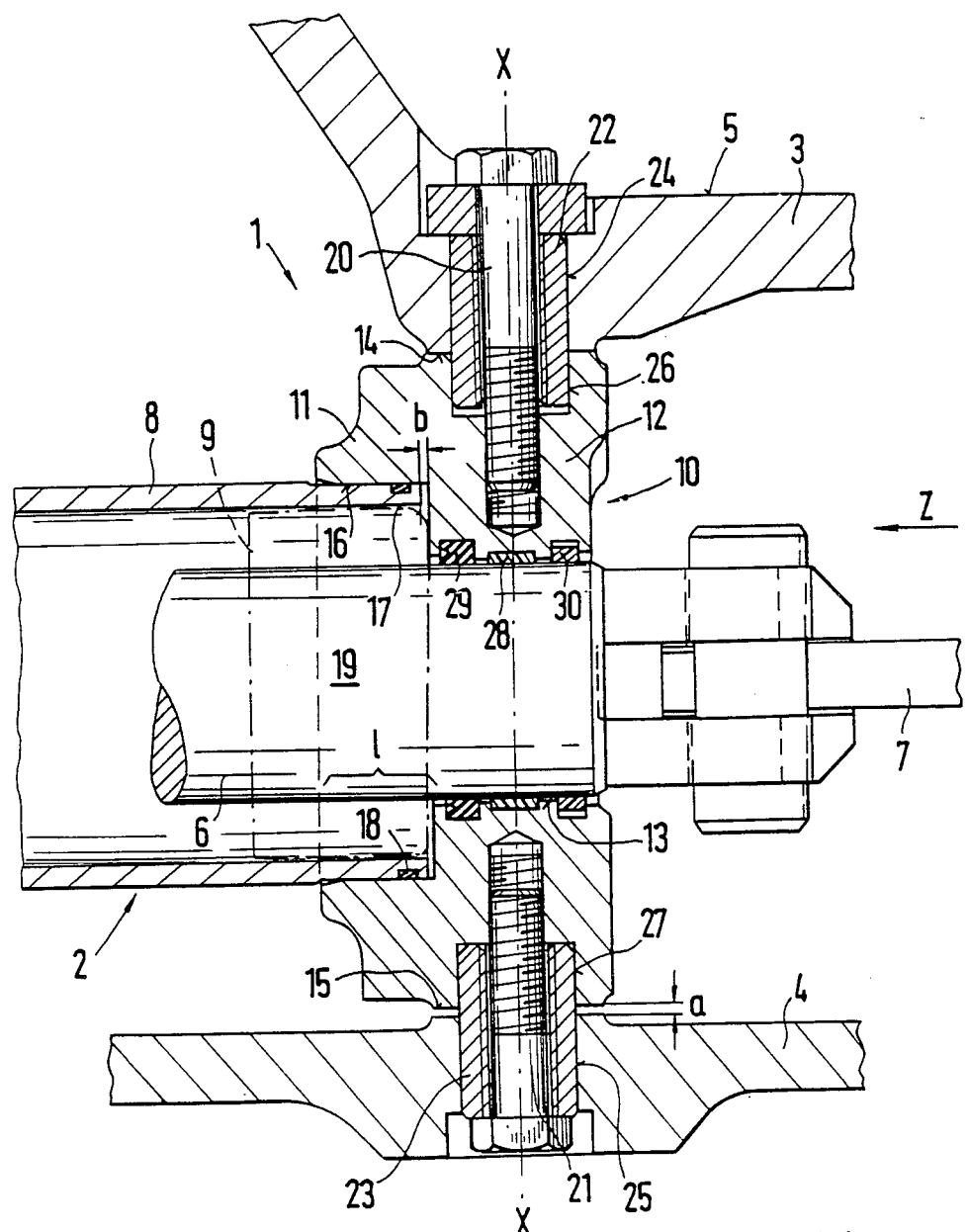
FIG. 1 is a rear elevational view of the steering axle in accordance with the present invention.
Figure 2:
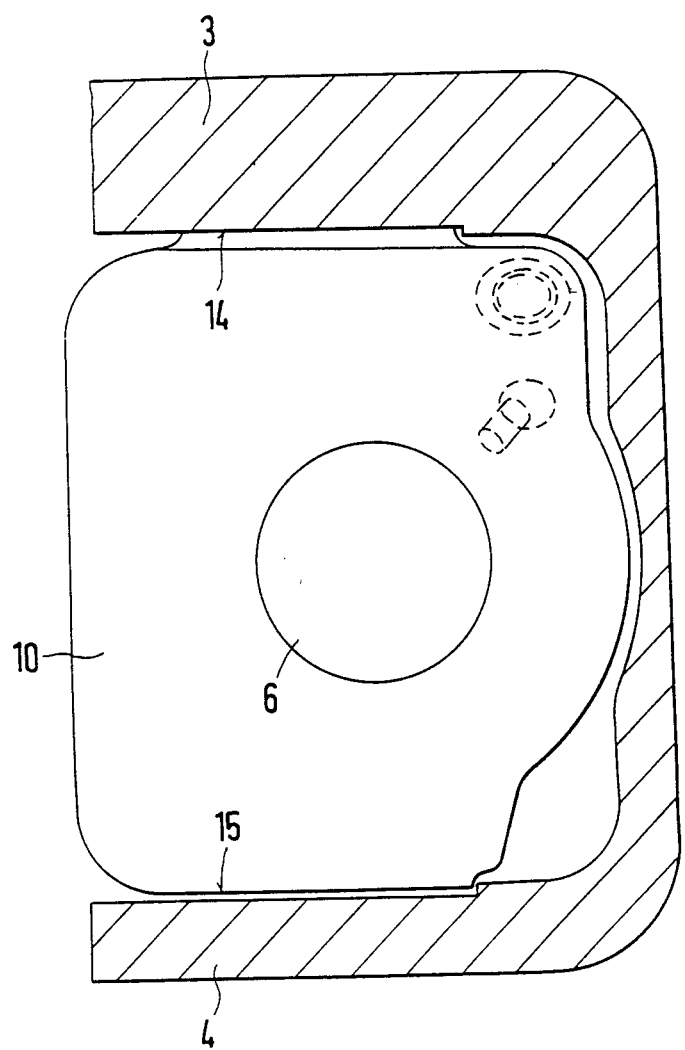
FIG. 2 is a side elevational view of the steering axle as viewed in the direction of arrow Z of FIG. 1.

Referring now to the drawing wherein like reference numerals are used throughout the two views to designate like parts, the steering axle generally designated by reference numeral 1 essentially includes a steering cylinder 2 which is supported and secured between the bearers 3 and 4 of a frame 5. This frame 5 is supported on the body side and is slightly pivotally retained in the vehicle longitudinal direction. A wheel carrier (not shown) is connected with the bearers 3 and 4 which is pivotally connected to a piston rod 6 of the steering cylinder 2 by way of a track rod 7.

The steering cylinder 2 includes a pipe or tubular cylinder member 8 which is closed off at each end by way of a cover generally designated by reference numeral 10. This cover 10 essentially includes a mounting part 11 and an adjoining bearing flange 12. The bearing flange 12 includes an inner bearing surface 13 for the piston rod 6 and outer support surfaces 14 and 15 which are directed toward the corresponding bearers 3 and 4 of the frame 5.

The mounting part 11 of the cover 10 includes a cylindrical recess 16 in which the free end 17 of the tubular cylinder member 8 is arranged with a sliding fit under interposition of a sealing ring 18. The end of the tubular member 8 is closed off by the bearing flange 12, whereby an additional stroke space 19 with the length l is formed inside of the recess 16 in the cover 10.

The cover 10 is adapted to be fixed at the bearers 3 and 4 by way of threaded bolts 20 and 21 which are arranged in bushings 22 and 23. The bushings 22 and 23 are constructed as fitting bushings and extend from a bore 24, 25 in the bearer 4, 5 up to a corresponding bore 26, 27 in the bearing flange 12.

The cover 10 is clamped by way of the one threaded bolt 20 with its one outer support surface 14 against the upper bearer 3 in such a manner that a frictional connection is established, and a displacement of the steering cylinder 3 with respect to the frame 5 is precluded.

The further outer support surface 15 is arranged with a clearance a with respect to the lower bearer 4. For purposes of obtaining this clearance a and to avoid a straining of the frame 5 when screwing fast the cylinder 2 by way of the bolt 21, the bushing 23 has a length determining the dimension a. It is supported between the base of the bore 27 and the head of the bolt 21.

For purposes of fastening the steering cylinder 2 at the frame 5 between the bearers 3 and 4 in a tolerance-compensating manner, the tubular cylinder member 8 is retained in the mountings 16 with a clearance b in order that a certain length compensation is attainable, by reason of coarse machining tolerances.

In the bearing flange 13, a guide band 28 is inserted into the inner bearing surface 13 of the cover 10 for the axially displaceable mounting of the piston rod 6. This band 28 is provided in a common vertical plane X—X with the threaded bolts 20 and 21. A sealing ring 29 is provided adjacent the guide band 28--facing the stroke space 19--and a wiper ring 30 is provided at the outwardly disposed side of the bearing flange 12.

Owing to the rigid connection of the cover 10 by way of the bolt 20 by reason of the frictional connection, no rotation of the cover 10 on the bushings 22, 23 is possible. A rotation could be caused by a transverse force of the track rod 7 on the piston rod 6. The slight friction on the guide band 28 would enable a torque, however, as the frictional connection is greater between the upper bearer 3 and the support surface 14 on the cover 10 no rotation of the steering cylinder 2 is possible any longer.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A steering axle for a vehicle, having a steering cylinder means, cover means, support frame means supported on a vehicle body, the steering cylinder means comprising a tubular cylinder member means closed off by the cover means and mounted inside of a cylindrical mounting means of a part of the cover means, the tubular cylinder member means forming with a free end thereof an area defined as an additional stroke space within a recess in said cylindrical mounting means, said additional stroke space being defined at an end of the tubular cylinder member means and by a bearing flange of the cover means which is rigidly connected with the support frame means by way of oppositely disposed threaded bolt means, wherein the tubular cylinder member means is mounted in the cylindrical mounting means with a sliding seal defined by a sealing ring, a clearance separating said cover means from said lower bearer of the frame means and being radially fixed by said threaded bolt means guided in cylindrical bushings in said lower bearer and said cover means, wherein the cover means abuts frictionally with a first external support surface at an upper bearer of the frame means and with a second support surface, arranged with said clearance with a lower bearer of the frame means.

wherein the cover means includes within an inner bearing surface of the bearing flange a ring-shaped guide band means receiving a piston rod, wherein the guide band means is in a common vertical plane with the threaded bolt means, and wherein the cylindrical bushings extend with a fitting seat in a bore of a respective bearer of the frame means to a respective bore of the bearing flange, and wherein the bushing inserted into said bore in said lower bearer of the frame means has a length determining the clearance between the cover means and the lower bearer, the bushing is inserted into said lower bearer at an end supported at a base of said bore of said lower bearer by a head of the threaded bolt.

2. A steering axle according to claim 1, wherein a frictional connection between the upper bearer and said first support surface of the cover means is greater than a frictional connection between the guide band means and a piston rod.

3. A steering axle according to claim 2, wherein a sealing ring and a wiper ring are arranged adjacent the guide band means, one on each side thereof, and wherein the sealing ring is arranged in a section of the bearing flange facing the adjacent said stroke space.

4. A steering axle for a vehicle, having a steering cylinder means, cover means, support frame means supported on a vehicle body, the steering cylinder means comprising a tubular cylinder member means closed off by the cover means and mounted inside of a cylindrical mounting means of a part of the cover means, the tubular cylinder member means forming with a free end thereof an area defined as an additional stroke space within a recess in said cylindrical mounting means, the additional stroke space being defined at an end of the tubular cylinder member means and by a bearing flange of the cover means which is rigidly connected with the support frame means by way of oppositely disposed threaded bolt means, wherein the threaded bolt means are guided in cylindrical bushings, and wherein the cylindrical bushings extend with a fitting seat in a bore of a respective bearer of the frame means to a respective bore of the bearing flange, and wherein the bushing inserted into the lower bearer of the frame means has a length determining a clearance between the cover means and the lower bearer the bushing is inserted into said lower bearer at an end supported at a base of said bore of said lower bearer by a head of the threaded bolt.

5. A steering axle according to claim 4, wherein the cover means includes within an inner bearing surface of the bearing flange a ring-shaped guide band means receiving a piston rod, and wherein the guide band means is arranged in a common vertical plane with the threaded bolt means.

6. A steering axle according to claim 5, wherein a frictional connection between the upper bearer and an outer support surface of the cover means is greater than a frictional connection between the guide band means and the piston rod.

* * * * *